March 24, 1936.   G. H. HART   2,034,865
THERMOSTATICALLY OPERATED SWITCH
Filed June 11, 1932   2 Sheets-Sheet 1

Inventor
George Hegeman Hart
Attorney

March 24, 1936. G. H. HART 2,034,865
THERMOSTATICALLY OPERATED SWITCH
Filed June 11, 1932 2 Sheets-Sheet 2
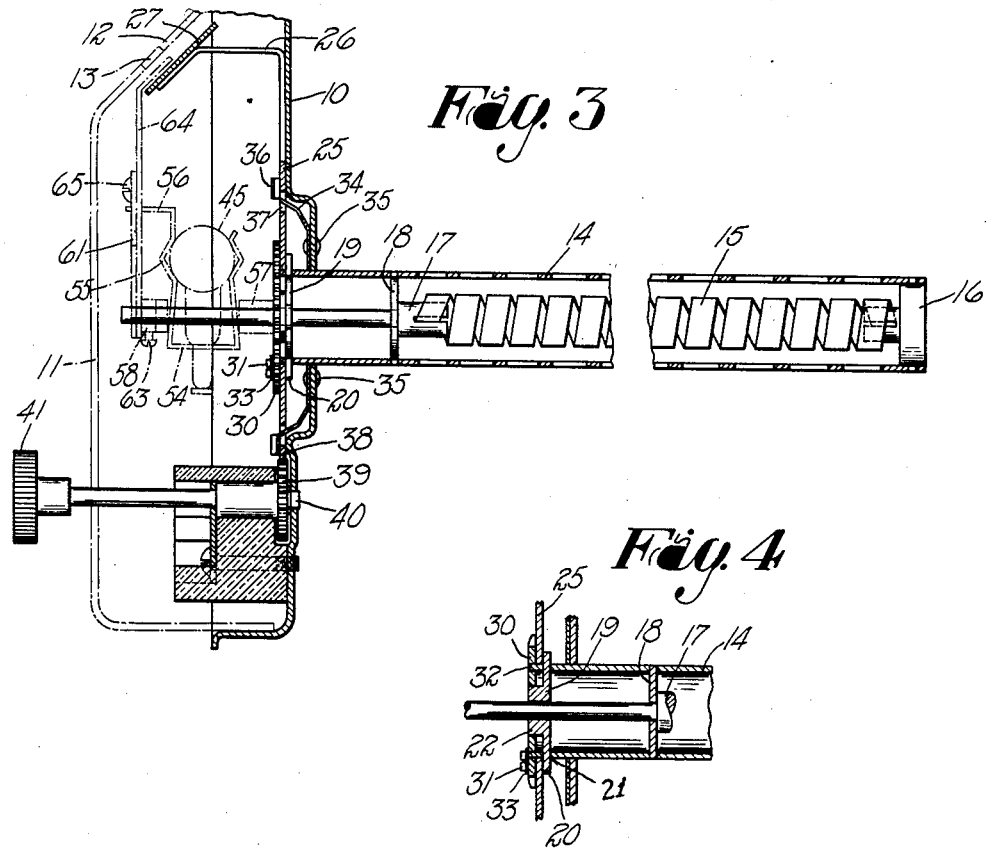
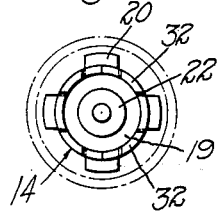
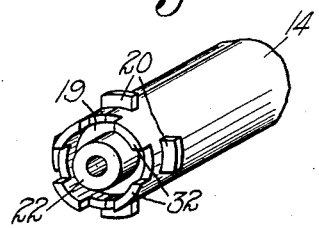
Inventor
George Hegeman Hart
By H. Clay Lindsey
Attorney Patented Mar. 24, 1936

2,034,865

UNITED STATES PATENT OFFICE 2,034,865

THERMOSTATICALLY OPERATED SWITCH

George Hegeman Hart, West Hartford, Conn.

Application June 11, 1932, Serial No. 616,682

3 Claims. (Cl. 200—139)

The present invention relates to a device including a thermostatically operated switch which may be set to throw the current on and off at predetermined temperatures, and indicating means operated by the thermostatic element for indicating the temperature of the apparatus to be controlled. As an instance of a use to which the device of the present invention may be applied, reference may be had to the controlling and indicating of the temperature of an electrically heated oven or the like. It is understood, however, that the present invention is not limited to that application.

The aim of the invention is to provide a device of this sort having various features of novelty and advantage and which is particularly characterized by its simplicity in construction, its effectiveness in operation, and the ease and facility with which it may be set to operate at any predetermined desired temperature within the range of operation for which the device is constructed.

A further aim of the invention is to provide a device of this sort which will permit of an easy setting of the device so that the switch is thrown on and off at any desired temperature and which will permit the temperature of the apparatus being controlled to be indicated at all times; and wherein undue strains on the thermostatic element during the setting operation of the device and the normal operation thereof are avoided.

Another object of the invention is to provide an improved arrangement wherein the thermostatically operated switch may be employed for the purpose of initially and manually throwing the current on to the device to be controlled and for positively and permanently breaking the circuit when it is desired to prevent the heat from again coming on. In an electrically heated oven, for example, it is the usual practice to provide a manually operable heater switch wherein the heat may be turned on and off at will, and a thermostatically operated switch in series with the heater switch and arranged to automatically control the temperature while the heater switch is on. In my improved arrangement, the heater switch may be eliminated.

Other objects will be in part obvious, and in part pointed out more in detail hereinafter.

The invention accordingly consists in the features of construction, combination of elements and arrangement of parts which will be exemplified in the construction set forth and the scope of the invention of which will be indicated in the appended claims.

In the accompanying drawings, wherein is shown, for illustrative purposes, one of the embodiments which the present invention may take, Fig. 1 is a front view of my improved thermostatic switch, the cover or cap of the casing being omitted and the switch being shown in "on" position;

Fig. 3 is a side view, with parts in section;

Fig. 4 is a detail view showing the manner in which the shaft associated with the thermostatic member is journalled;

Fig. 5 is an end view of what is shown in Fig. 4 with the toothed wheel omitted; and Fig. 6 is a perspective view of the forward end of the perforated pipe within which the thermostatic member is positioned.

Figure 1:
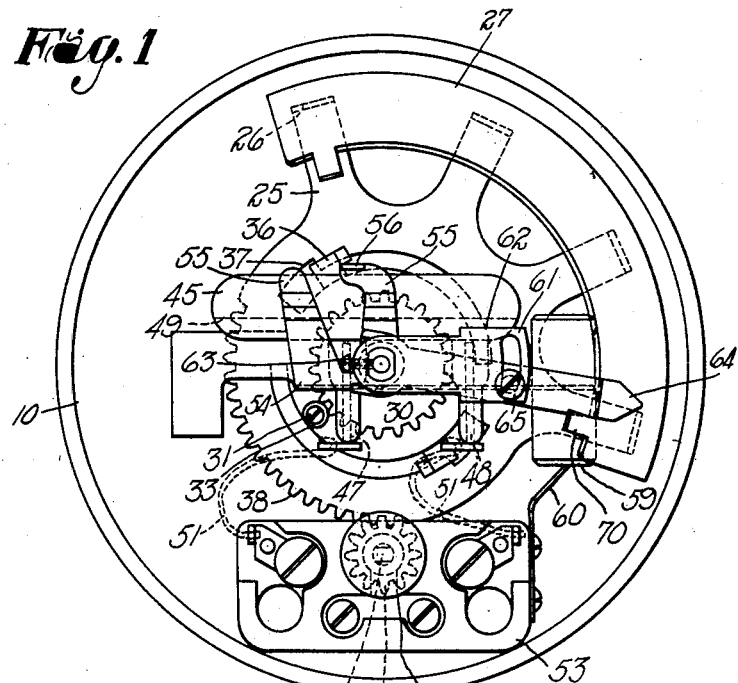

Referring to the drawings in detail, the device may have a casing, here shown as including a base plate 10, of any suitable shape adapted to be secured to an oven wall or the like in any desired manner. The casing also has a cover 11 provided with an arcuate opening 12 through which the hereinafter described movable scale and movable pointer may be observed. The opening 12 has a fixed pointer 13 with which the movable scale is adapted to cooperate to indicate setting of the device. The base plate 10 has a central opening in which is journalled a supporting member in the form of a perforated pipe or cage 14. The forward end of this pipe extends into the casing and its rear end is adapted to be received within the chamber of an oven or the like. Within this pipe member is a thermostatic element which may be of any suitable type but which is here shown as being in the form of a bi-metallic helix 15 the rear end of which is anchored to a plug 16. The front end of this thermostatic element is fixed to so as to rotate a shaft 17 which is journalled in a pair of spaced discs or partitions 18 and 19. The forward plate 19 is provided with ears 20 which extend through and beyond slots 21 adjacent the forward end of the pipe or tube 14. This partition also has a forwardly extending hub 22.

The numeral 25 designates a scale carrying member fixed to the supporting member 14 so as to be adjustable therewith. In the present instance, this carrying member is in the form of a plate, the rear face of which is in frictional engagement with the front face of the base plate 10 of the casing. The plate 25 has a plurality of fingers 26 to which is secured a scale member 27, disposed behind the sight opening 12. This scale may be marked off in any suitable units for indicating temperatures. The plate 25 has an opening which more or less closely receives the forward end of the pipe 14 forwardly of the ears 20. The dial carrying plate is adjustably secured to the pipe 14 in any suitable manner so as to permit of calibration of the device. By way of example, there is here shown for that purpose a toothed disc 30 and a screw 31. The disc 30 has slots through which extend fingers 32 on the pipe 14 so that the disc is fixed to the pipe 14. The screw 31 is carried by the plate 25 and has a head or washer 33 adapted to engage the ends of the teeth so as to lock the plate to the disc against relative rotation during normal operation of the device. It will be understood that when the screw is loosened the plate 25, together with the scale carried thereby, may be angularly adjusted with respect to the thermostatic member. It will also be clear that after the plate 25 has been secured to the pipe by the screw 30, the scale, the supporting member 14, and the thermostatic element may be set as a unit. The carrying plate 25 is frictionally held against the base of the casing by a leaf spring 34 which is anchored, as by rivets 35, to the base of the casing. This spring has a pair of fingers 36 which extend through slots 37 in the plate 25 and bear against the front face of that plate.

The angularly adjustable unit which includes the thermostatic element and the scale 27 may be set in any desired manner but, by way of illustration, I have shown for this purpose the plate as having a concentric segment portion 38 the teeth of which mesh with a pinion 39 fixed to a stem or spindle 40 the forward end of which extends beyond the cover of the casing and is provided with a knob or handle 41.

The switch means is here shown, for illustrative purposes, as being in the form of a mercury switch comprising a transparent tube 45 having a pair of spaced wells in its bottom wall and into which extend the respective terminals 47 and 48. The circuit closing member comprises a fluid body such as a mass or body of mercury 49. The terminals of the switch may be connected by wires 51 to fixed terminals carried by an insulating block 53 located within the casing. The setting member which includes the pinion 39 and the handle 41 may be journalled in this block. The mercury switch is carried by a holder 54 having two pairs of spring fingers 55 between which the glass tube is held. One of these fingers terminates in an outturned lug 56 the purpose of which will be later described. The holder is loosely pivoted on the forwardly extending end of the shaft 17 so that rotary movement of this shaft is not directly communicated to the mercury switch. The holder is held against movement longitudinally of the shaft by a pair of loose collars or sleeves 57 and a fixed collar 58. The holder is provided with a weight 59 adapted to rest on a stop 60 so that normally the switch is urged into the horizontal or "on" position shown in Fig. 1.

Secured to the forwardly projecting end of the shaft 17 is an operating member for moving the switch to "off" position under the influence of the thermostatic element. In the present instance, this operating member is in the form of a radially extending arm 61 having an edge 62 adapted to engage the forwardly extending lug 56 of the mercury switch when the temperature of the apparatus has reached a predetermined degree. This operating member or arm is preferably adjustably secured to the shaft and, to this end, the arm may be carried by the collar 58 and the latter may be adjustably secured to the shaft by a screw 63. Associated with the operating member and adapted to move therewith is a pointer 64 adapted to cooperate with the scale 27 for indicating the temperature at any time within the apparatus to be controlled. In the present instance, the inner end of this pointer is forked so as to straddle the collar 58 and it carries between its ends a set screw 65 which is accommodated by an arcuate slot in the arm 61. With this arrangement, the pointer may be adjusted with respect to the thermostatic element and scale so that it will properly indicate the temperature of the oven.

In accordance with the present invention, the arrangement is such that the mercury switch may be manually moved to an off position in which it is positively held until again manually thrown on so that the thermostat is rendered inoperative during such period. To this end, the arrangement is such that, when the thermostat and scale, together with the operating member 61, are moved to a position beyond that at which the thermostat is adapted to throw the current onto the heating element, the mercury switch is tilted to an "off" position. This arrangement may take various forms. In the present instance, the arrangement is such that, when the unit, which includes the supporting member, the scale, the thermostatic element and the indicating pointer, is moved to its extreme counterclockwise position, the operating member engages the lug 56 of the holder and thus prevents the switch from again coming on. In this position, a lug or shoulder 70 on the scale engages the right hand edge of the indicating pointer so that the thermostat cannot move the operating member 61 clockwise and thus permit the switch to be thrown on automatically.

Figure 2:
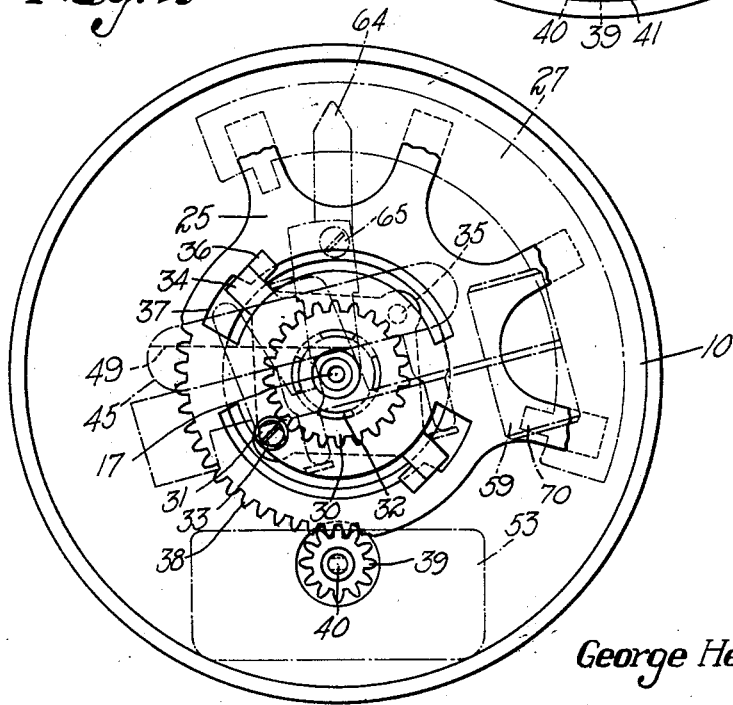
Fig. 2 is a view similar to Fig. 1 but showing the switch in "off" position, a portion of the casing also being illustrated.

The operation of the device is briefly as follows: The temperature (say 500°) to which the oven or other mechanism or chamber is to be heated having been determined, the setting member will be turned by the knob 41 until the scale mark 500 is brought opposite to the fixed pointer 13 which indicates the desired temperature. Thus, the distance between the operating member 61 and the lug 56 of the switch holder is set. The weight on the switch rests on the stop 60 so that the switch is held in horizontal position and in which position the mercury closes contact between the terminals. The heating element within the oven is now on and, as the temperature of the oven rises, the thermostatic element will turn the operating member counterclockwise until the operating member engages the lug 56 whereupon the switch will be turned counterclockwise about the axis of the shaft 19, as shown in Fig. 2. When the switch is thus tilted, the mercury will flow to the left hand and now lower end of the glass tube, thus breaking the connection between the terminals and shutting off the current within the oven. In the event the heat within the oven should continue to rise, neither the switch mechanism nor the thermostat would be injured as the operating member would merely continue to move the mercury switch to a more inclined position. After the heat is turned off, the temperature of the oven will drop, with the result that the thermostatic element will turn the operating member clockwise until the latter leaves the lug 56, whereupon the switch is brought back to the position shown in Fig. 1, the current being again thrown onto the oven.

It will be observed that the mercury switch may be employed in place of the usual heater switch for manually throwing the current on at any time and also for manually throwing the current off, irrespective of the condition of the thermostatic element. In the embodiment illustrated, when it is desired to throw the oven out of operation and leave it out of operation, the knob is turned clockwise until the scale has been moved to an extreme counterclockwise position, and in which position the operating member is held against the lug 56 of the switch holder by the shoulder 70 on the scale. This may be done at any time. When it is desired to throw the current onto the oven, it is merely necessary to rotate the knob counterclockwise and thereby move the operating member away from the lug on the switch holder.

From the foregoing description taken in connection with the accompanying drawings, it will be observed that my improved device provides for positively and manually turning the current on and off at any time, for accurately controlling the temperature of the oven or other apparatus with which it is associated, and for indicating the temperature of the oven during the normal operation of the device. The device is readily settable so that the switch may be thrown on and off by the thermostat at any desired temperature within the range of operation for which the device is constructed. In setting the device, there is no danger of injuring the parts or adversely affecting the thermostatic member, it being clear that, when the thermostat is adjusted, the scale, together with the operating member and indicating pointer, are also adjusted as a unit.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. A thermostatically operated switch comprising a freely pivotal switch support, an electrical switch therefor arranged to be shifted to a reverse position by said pivotal movement, stops limiting the extent of said pivotal switch movement and providing an open circuit and a closed circuit position for the switch, means tending to normally maintain the switch in one of said positions, a thermostatic device responsive to changes in temperature, a movable member actuated by said device under the influence of temperature changes and engageable with the support to pivotally move and shift the switch when the device reaches a predetermined temperature, a graduated scale, a pointer adjustably secured to said movable member for movement therewith to register the temperature of the thermostatic device on said scale, means to adjustably and fixedly locate the pointer relative to said movable member and manually adjustable means to pre-position said member relative to the switch support whereby the switch may be automatically shifted to a reverse position at any predetermined temperature.

2. In a thermostatically operated switch, a switch comprising a pivoted mercury tube normally urged to "on" position, a rotatably settable supporting member, a thermostatic element connected to said supporting member so as to be settable therewith, an indicating scale connected to said supporting member so as to be settable therewith, a fixed pointer cooperating with said scale, a shaft connected to said thermostatic element so as to be turned thereby, an operating member connected to said shaft and adapted to engage said switch, a temperature indicating pointer member movable relative to said scale and connected to said operating member, means on the scale limiting the maximum extent of movement of said pointer and means for setting the unit comprising said supporting member, scale and thermostatic element, said unit being settable to an extreme position where the pointer is engaged by the scale and said switch is positively held in "off" position.

3. A thermostatically operated switch comprising a freely pivotal switch support, a switch therefor, stops limiting said pivotal movement and providing an open circuit and a closed circuit position for the switch, means tending to normally maintain the switch in one of its limiting positions, a thermostatic element responsive to variations in temperature, a member projecting from the support, an arm actuated by said element and arranged for an arcuate movement towards or from said member to operate the switch and move it to a reverse position when a desired temperature is reached, a movable graduated scale, a pointer secured to the movable arm and arranged for integral arcuate movement therewith to register the temperature of the element on said scale at all times, manually adjustable means to pre-position both the arm and the scale whereby the switch may be automatically shifted to a reverse position at any desired temperature, and means on said scale engageable with the pointer whereby the maximum scale movement as caused by the manually adjustable means will serve to move the arm into positive engagement with the switch support and maintain the switch in a reverse position.

GEORGE HEGEMAN HART.